(12) United States Patent
Andrews et al.

(10) Patent No.: US 9,762,561 B2
(45) Date of Patent: Sep. 12, 2017

(54) SYSTEM AND METHOD FOR TUNNELING OF MANAGEMENT TRAFFIC

(71) Applicants: Carlton A. Andrews, Austin, TX (US); Sandeep V. Karandikar, Austin, TX (US); Douglas M. Anson, Dripping Springs, TX (US)

(72) Inventors: Carlton A. Andrews, Austin, TX (US); Sandeep V. Karandikar, Austin, TX (US); Douglas M. Anson, Dripping Springs, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 328 days.

(21) Appl. No.: 13/665,279

(22) Filed: Oct. 31, 2012

(65) Prior Publication Data
US 2014/0122717 A1    May 1, 2014

(51) Int. Cl.
| G06F 15/16 | (2006.01) |
| H04L 29/06 | (2006.01) |
| H04L 12/24 | (2006.01) |
| H04L 12/46 | (2006.01) |

(52) U.S. Cl.
CPC .......... H04L 63/08 (2013.01); H04L 12/4633 (2013.01); H04L 41/04 (2013.01)

(58) Field of Classification Search
CPC ...................................................... H04L 63/08
USPC ......................................................... 709/217
See application file for complete search history.

(56) References Cited

U.S. PATENT DOCUMENTS

| 6,523,696 | B1 * | 2/2003 | Saito ................. H04N 21/2381 375/E7.019 |
| 7,356,539 | B2 | 4/2008 | Brown et al. |
| 7,599,305 | B2 * | 10/2009 | Bui .............................. 370/252 |
| 8,073,444 | B2 | 12/2011 | Riley |
| 2003/0009546 | A1 * | 1/2003 | Benfield et al. ............. 709/223 |
| 2003/0009547 | A1 * | 1/2003 | Benfield et al. ............. 709/223 |
| 2003/0041167 | A1 * | 2/2003 | French et al. ................ 709/238 |
| 2003/0179746 | A1 * | 9/2003 | Moon ................... D06F 39/005 370/352 |
| 2004/0174822 | A1 * | 9/2004 | Bui .............................. 370/252 |
| 2004/0193881 | A1 * | 9/2004 | Ayaki .................. H04L 12/2803 713/168 |
| 2004/0215744 | A1 * | 10/2004 | Motoyama ............ G06F 9/4411 709/217 |
| 2006/0155984 | A1 * | 7/2006 | Tsuchida ............. H04L 12/2803 713/156 |
| 2006/0215583 | A1 * | 9/2006 | Castagnoli .................... 370/254 |
| 2007/0180142 | A1 * | 8/2007 | Small et al. .................. 709/245 |
| 2007/0189190 | A1 * | 8/2007 | Feng et al. .................... 370/254 |

(Continued)

*Primary Examiner* — Karen Tang
(74) *Attorney, Agent, or Firm* — Larson Newman, LLP

(57) ABSTRACT

A method of tunneling management traffic includes receiving at a managed system a control feature from a proxy-managed system that is connected to the managed system, determining that the proxy-managed system is not visible to a management system, providing the control feature to the management system in response to determining that the proxy-managed system is not visible, receiving a modification to the control feature from the management system, and providing, from the managed system, the modification to the control feature to the proxy-managed system in response to receiving the modification to the control feature from the management system.

14 Claims, 3 Drawing Sheets

(56) References Cited

U.S. PATENT DOCUMENTS

| | | | |
|---|---|---|---|
| 2007/0197236 A1* | 8/2007 | Ahn | H04L 12/2809 455/466 |
| 2008/0026725 A1* | 1/2008 | Cha | H04M 1/2535 455/411 |
| 2008/0282182 A1* | 11/2008 | Oosaka | H04L 12/2803 715/772 |
| 2008/0289001 A1 | 11/2008 | Brown et al. | |
| 2010/0121949 A1* | 5/2010 | Cho | 709/224 |
| 2011/0228314 A1* | 9/2011 | Scaff | 358/1.15 |
| 2011/0228332 A1* | 9/2011 | Doyle et al. | 358/1.15 |
| 2011/0289202 A1 | 11/2011 | Riley | |
| 2013/0067076 A1* | 3/2013 | Sivaramakrishna Iyer et al. | 709/224 |
| 2013/0173909 A1* | 7/2013 | Arno et al. | 713/153 |
| 2013/0212411 A1* | 8/2013 | Nicholson et al. | 713/310 |
| 2013/0214935 A1* | 8/2013 | Kim | G08C 17/02 340/870.02 |

* cited by examiner

SYSTEM AND METHOD FOR TUNNELING OF MANAGEMENT TRAFFIC

FIELD OF THE DISCLOSURE

This disclosure relates generally to information handling systems, and relates more particularly to tunneling of management traffic.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems. An information handling system can include virtual machines that run operating systems and applications on a common host system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion focuses on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

Figure 1:
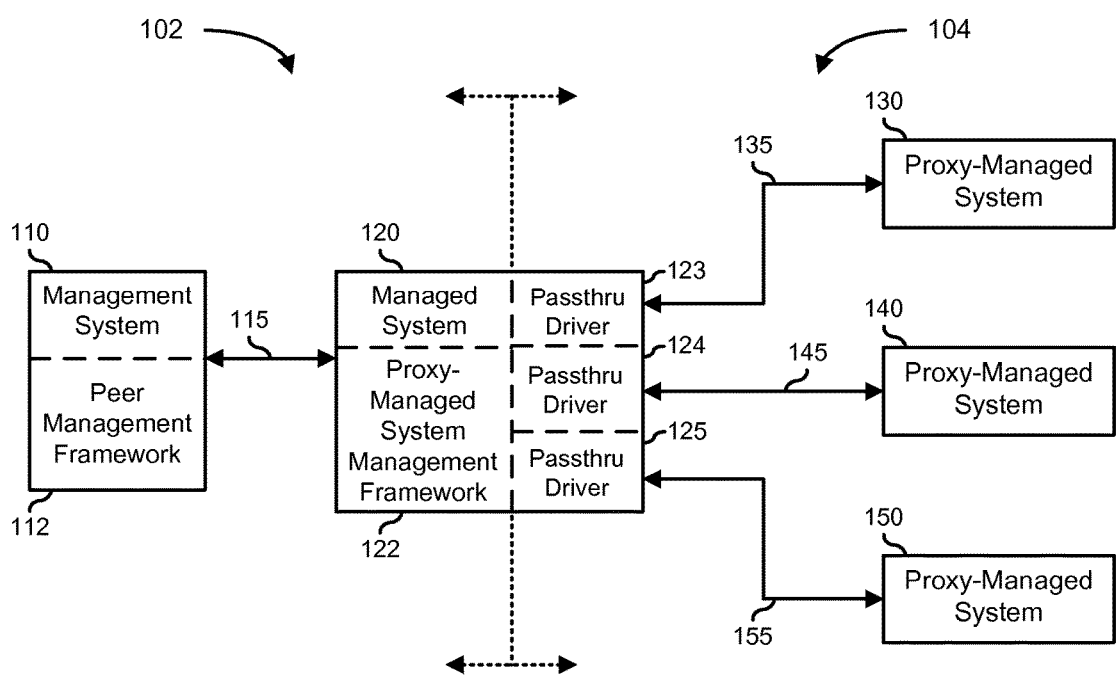
FIG. 1 is a block diagram of a managed network according to an embodiment of the present disclosure.

FIG. 1 illustrates a managed network 100 including one or more information handling systems. For purpose of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the infatuation handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

Managed network 100 includes a management system 110, a managed system 120, and proxy-managed systems 130, 140, and 150. Management system 110 is connected to managed system 120 by a management interface 115, managed system 120 is connected to proxy-managed system 130 by a peer interface 135, to proxy-managed system 140 by a peer interface 145, and to proxy-managed system 150 by a peer interface 155. Proxy-managed systems 130, 140, and 150 represent devices that are local to managed system 120 and that are visible to the managed system, but are not visible to management system 110. As such, from the perspective of management system 110, managed network 100 is subdivided into a management system visible network 102 that includes management system 110 and managed system 120, and a managed system visible network 104 that includes the managed system and proxy-managed systems 130, 140, and 150. As used herein, the term visible is to be understood in terms of the ability of one system to reach, discover, or connect to another system.

As local devices, proxy-managed systems 130, 140, and 150 represent various local functions that are provided to managed system 120 through respective peer interfaces 135, 145, and 155. The functions provided by proxy-managed systems 130, 140, and 150 are primarily to the benefit of managed system 120, but are not necessarily so. An illustrative example of proxy-managed system 130 includes a media projector that provides a projected display for managed system 120 and that is connected to managed system 120 via peer interface 135. Here, peer interface 135 can include a media cable such as an HDMI cable, a wireless interface such as a WiFi or Bluetooth interface, or another interface operable to provide media information from the managed system to the proxy-managed system. An illustrative example of proxy-managed system 140 includes a wireless keyboard/mouse associated with managed system 120 that includes a wireless base that is connected to the managed system via peer interface 145. Here, peer interface 145 can include a USB cable or the like, and the wireless keyboard/mouse can communicate with the wireless base via a short distance over-the-air interface such as a near field communication (NFC) link, an infrared communication link, a Bluetooth communication link, or another short distance communication link. An illustrative example of proxy-managed system 150 includes a printer that is connected to managed system 120 via peer interface 155. Here, peer interface 155 can include a printer cable, an RS-232 cable, or another printer cable. It will be understood that the example proxy-managed systems 130, 140, and 150 are illustrative of a wide variety of devices that can be connected to managed system 120, and that other types of proxy-managed systems can be connected to managed system 120, as needed or desired.

In a particular embodiment, proxy-managed systems 130, 140, and 150 are characterized by the fact that they include limited management interoperability with managed system 120. For example, limited management interoperability can mean that one or more of proxy-managed systems 130, 140, and 150 do not include an Internet Protocol (IP) stack to provide end-to-end connectivity and browser based access to the management features of the proxy-managed systems. Instead, proxy-managed systems 130, 140, and 150 can be accessed by managed system 120 via passthru device drivers 123, 124, and 125 that are associated with the proxy-managed systems. In another example, limited management interoperability can mean that the ability of managed system 120 to control or monitor proxy-managed systems 130, 140, and 150 is limited. For example, where proxy-managed system 130 represents a media projector, a projector driver 123 for the media projector can include an ability to control a projector brightness and to report a bulb usage. Further, where proxy-managed system 140 represents a wireless keyboard/mouse a keyboard-mouse driver 124 for the wireless keyboard/mouse can include an ability to report a battery level. Also, where proxy-managed system 150 represents a printer, a printer driver 125 can report ink levels in the printer. It will be understood that the example controls and status indications of proxy-managed systems 130, 140, and 150 are illustrative of a wide variety of controls and status indications that can be associated with the proxy-managed systems, and that other controls and status indications can be associated with the proxy-managed systems, as needed or desired. For example, a proxy-managed system may be manageable as to power modes and a time window for operation at a particular power mode, or may be enabled to receive a firmware update from managed system 120. In a particular embodiment, one or more of proxy-managed systems 130, 140, or 150 include a proxy managed system management framework (not illustrated) that provides a predefined interface for managing the proxy-managed system.

As a portion of managed system visible network 104, managed system 120 operates to access the manageability features of proxy-managed systems 130, 140, and 150 as described above. Thus managed system 120 includes one or more user interfaces (UIs) that are associated with proxy-managed systems 130, 140, and 150 and that permit the managed system to control and monitor the proxy-managed systems. The UIs permit a user of managed system 120 to view and manipulate the control and status features of proxy-managed systems 130, 140, and 150. In a particular embodiment, the UIs are defined by passthru device drivers 123, 124, and 125 for each respective proxy-managed system 130, 140, and 150. In another embodiment, the UIs for proxy-managed systems 130, 140, and 150 are consolidated into a proxy-managed system management framework 122 administered by managed system, such that the user can conveniently view and manipulate the control and status features of all proxy-managed systems that are connected to the managed system.

As a portion of management system visible network 102, managed system 120 operates as a managed peer to management system 110, where the management system includes a peer management framework 112 for viewing and manipulating management features of the managed system. The management of managed system 120 via peer management framework 122 of management system 110 is known in the art, and further discussion of managing peer systems is beyond the scope of this disclosure. In addition to operating as a managed peer to management system 110, managed peer 120 operates as a management proxy to enable the management system to control and monitor proxy-managed systems 130, 140, and 150. In a particular embodiment, managed system 120 operates as a management proxy by forwarding the UIs for proxy-managed systems 130, 140, and 150 to management system 110. Management system 110 then incorporates the UIs with peer management framework 122 such that the management system is provided with a complete view of the elements of managed network 100. Thus, by acting as a management proxy, managed system 120 provides a tunnel of the control and status information for target systems 130, 140, and 150 to management system 100, permitting the management system to view and manage the elements of managed system visible network 104, including the target systems. In this way, a user of management system 110 can view and manipulate the control and status features of proxy-managed systems 130, 140, and 150.

In a particular embodiment, one or more proxy-managed system 130, 140, or 150 requires authentication in order to access the control and status functions of the proxy-managed systems. For example, proxy-managed system 130 may be protected by a username and password combination in order to change the projector brightness or to access the bulb usage information. In a first case, proxy-managed system 130 is associated with managed system 120, such that the managed system includes the authentication credentials for the proxy-managed system. In this case, managed system 120 provides the authentication credentials to management system 110 to permit the management system to access the control and status functions of proxy-managed system 130. Alternately, managed system authenticates with proxy-managed system 130 through proxy-managed system management framework 122, and provides management system 110 with access to the proxy-managed system management framework in order to access the control and status functions of proxy-managed system 130.

In a second case, proxy-managed system 130 is associated with managed network 100, and management system 110 includes the authentication credentials for the proxy-managed system. Here, when managed system 120 is connected to proxy-managed system 130, the managed system recognizes that it has been connected to the proxy-managed system, and obtains identification information for the proxy-managed system. Managed system 120 then provides the identification information to management system 100, and the management system provides the authentication credentials for proxy-managed system 130 to the managed system. For example, managed system 120 can represent a managed laptop system, and proxy-managed system 130 can represent a media projector in a conference room. Here, when a user of managed system 120 enters the conference room to give a presentation, the user can connect to proxy-managed system 130 via a NFC connection or a media cable. The presentation may be displayed by the projector without any authentication credentials from the managed laptop system. However, the identification information for the media projector can be provided to the managed laptop system, which can in turn provide the identification information to management system 110. Management system 110 can provide the authentication credentials to the managed laptop system to gain access to the bulb usage information through managed system 120. In a particular embodiment, the proxy functions of managed system 120 can be invisible to the user of the managed system. Thus, in the preceding example, the user of the managed laptop system may be unaware that the management system 110 has obtained the bulb usage information from the projector. In another embodiment, management system 110 operates to manage proxy-managed systems 130, 140, and 150 in accordance with a predetermined policy for each type of proxy-managed system. For example, management system 110 can determine that printers in managed network 100 should be set to a low power mode during the evening and at night, but that the printers should be set to a normal operating mode during the day. Here, when managed system 120 is connected to proxy-managed system 150, management system 110 can determine the power mode settings for the proxy-managed system, and can modify the power mode settings to comply with the predetermined policy.

Figure 2:
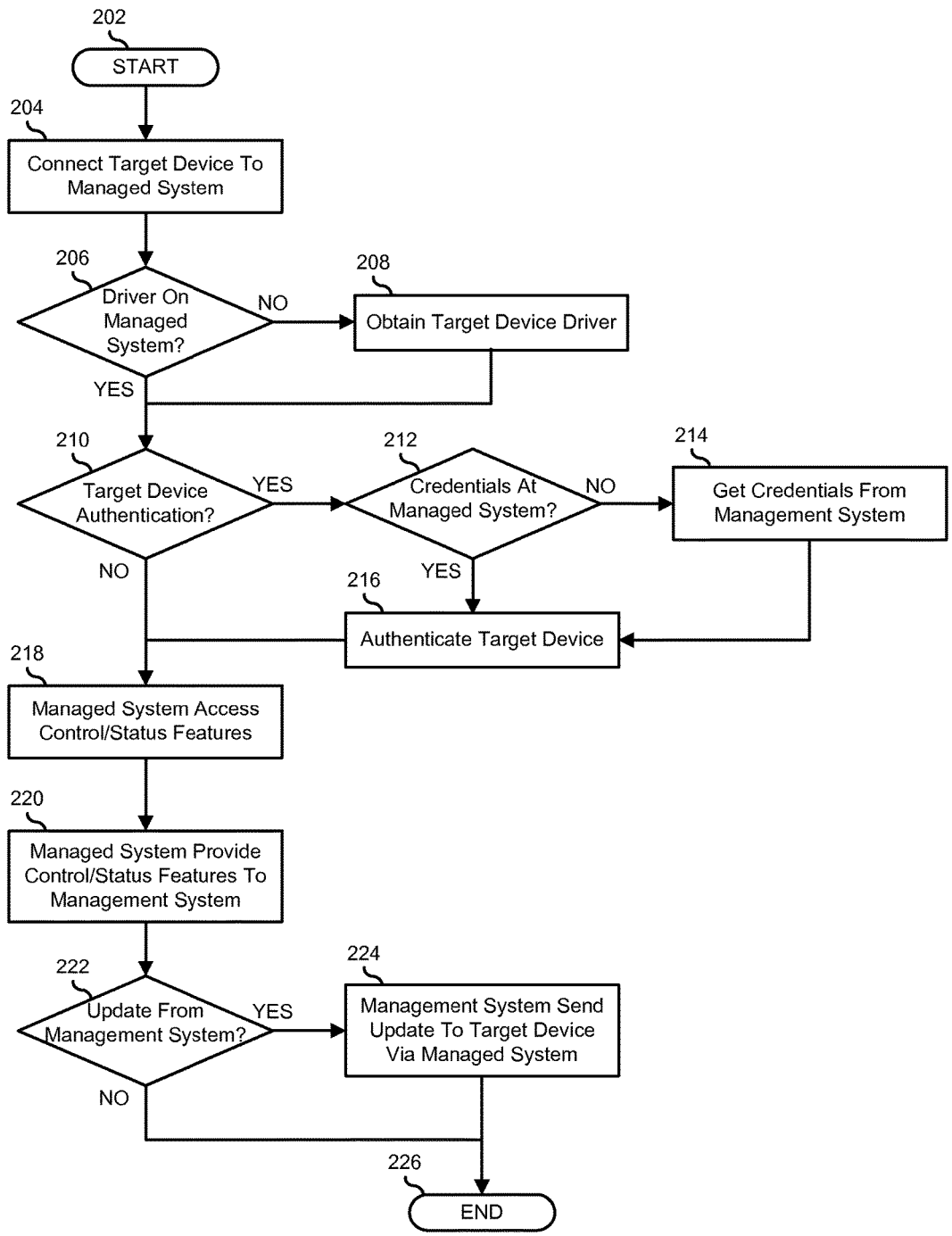
FIG. 2 is a flow diagram of a method of tunneling management traffic according to an embodiment of the present disclosure.

FIG. 2 illustrates a method of tunneling management traffic, beginning at block 202. A proxy-managed system is connected to a managed system in block 204. For example, a managed system such as a managed laptop system can be connected to a peripheral device such as a projector, a keyboard/mouse, a printer, a dock, or another peripheral device. The managed laptop system can be connected to the peripheral device via a cabled interface such as a USB cable, a printer cable, a media cable, or the like, or via a wireless interface such as a WiFi network, a Bluetooth interface, a NFC interface, or the like. A decision is made as to whether or not a driver for the proxy-managed system is available on the managed system in decision block 206. If not, the "NO" branch of decision block 206 is taken, the driver for the proxy-managed system is obtained by the managed system, and the method proceeds to decision block 210 as described below. For example, the proxy-managed system may be connected to the managed system via an interface that permits a plug-and-play operation, or the proxy-managed system can provide the managed system with a location to download the driver, or the driver can be obtained from the proxy-managed system, as needed or desired.

If a driver for the proxy-managed system is available on the managed system, as determined in decision block 206, the "YES" branch is taken, and a decision is made as to whether or not the proxy-managed system requires authentication to access the features of the proxy-managed system. If not, the "NO" branch of decision block 210 is taken, and the method proceeds to block 218 as described below. If the proxy-managed system requires authentication, the "YES" branch of decision block 210 is taken, and a decision is made as to whether or not the authentication credentials are available at the managed system in decision block 212. If so, the "YES" branch of decision block 212 is taken and the method proceeds to block 216 as described below. If the authentication credentials are not available at the managed system, the "NO" branch of decision block 212 is taken, and the authentication credentials are obtained from a management system in block 214. For example, the proxy-managed system can be associated with a network that includes a management system similar to management system 110, and the management system can provide the authentication credentials to the managed system. In an alternative embodiment, neither the managed system nor the management system has the authentication credentials, and the managed system is denied access to the proxy-managed system.

After determining that the managed system includes the authentication credentials in decision block 212, or after obtaining the authentication credentials from the management system in block 214, the managed system authenticates access to the proxy-managed system in block 216. After determining that the proxy-managed system does not require authentication in decision block 210, or after authenticating the managed system to access the proxy-managed system in block 216, the managed system access control and status features of the proxy-managed system in block 218. For example, the managed system can include a proxy-managed system management framework that permits the managed system to access the control and status features of the proxy-managed system, or the passthru device driver for the proxy-managed system can provide a UI that permits access. The managed system provides access to the control and status features of the proxy-managed system to the management system in block 220. For example, the management system can include a peer management framework that permits the management system to access the control and status features of the proxy-managed system through the managed system, or the UI can be provided by the managed system to the management system.

A decision is made as to whether or not the management system is going to perform an update or a modification to the proxy-managed system in decision block 222. If not, the "NO" branch of decision block 222 is taken and the method ends in block 226. If the management system is going to perform an update or a modification to the proxy-managed system, the "YES" branch of decision block 222 is taken, the management system sends the update or modification to the proxy-managed system via the managed system in block 224, and the method ends in block 226.

Figure 3:
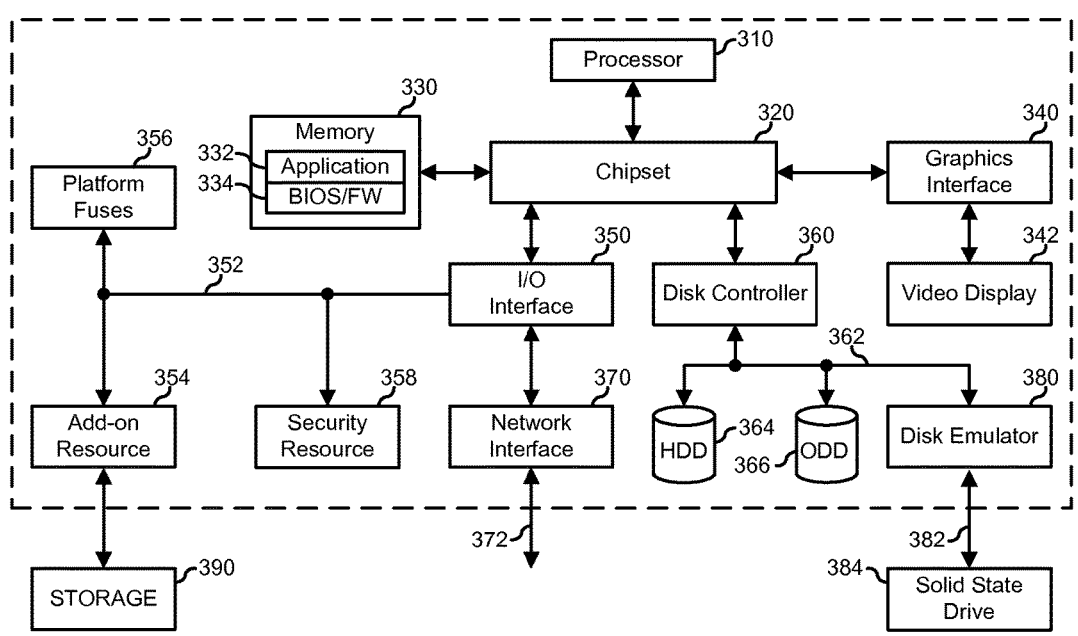
FIG. 3 is a functional block diagram illustrating an exemplary embodiment of an information handling system.

FIG. 3 illustrates an information handling system 300, including a processor 310, a chipset 320, a memory 330, a graphics interface 340, an input/output (I/O) interface 350, a disk controller 360, a network interface 370, and a disk emulator 380. In a particular embodiment, information handling system 300 is used to carry out one or more of the methods described herein. In another embodiment, one or more of the systems described herein are implemented in the form of information handling system 300.

Chipset 320 is connected to and supports processor 310, allowing the processor to execute machine-executable code. In a particular embodiment, information handling system 300 includes one or more additional processors, and chipset 320 supports the multiple processors, allowing for simultaneous processing by each of the processors and permitting the exchange of information among the processors and the other elements of the information handling system. Chipset 320 can be connected to processor 310 via a unique channel, or via a bus that shares information among the processor, the chipset, and other elements of information handling system 300.

Memory 330 is connected to chipset 320. Memory 330 and chipset 320 can be connected via a unique channel, or via a bus that shares information among the chipset, the memory, and other elements of information handling system 300. In another embodiment (not illustrated), processor 310 is connected to memory 330 via a unique channel. In another embodiment (not illustrated), information handling system 300 includes separate memory dedicated to each of the one or more additional processors. A non-limiting example of memory 330 includes static random access memory (SRAM), dynamic random access memory (DRAM), non-volatile random access memory (NVRAM), read only memory (ROM), flash memory, another type of memory, or any combination thereof.

Graphics interface 340 is connected to chipset 320. Graphics interface 340 and chipset 320 can be connected via a unique channel, or via a bus that shares information among the chipset, the graphics interface, and other elements of information handling system 300. Graphics interface 340 is connected to a video display 342. Other graphics interfaces (not illustrated) can also be used in addition to graphics interface 340 as needed or desired. Video display 342 includes one or more types of video displays, such as a flat panel display, another type of display device, or any combination thereof.

I/O interface 350 is connected to chipset 320. I/O interface 350 and chipset 320 can be connected via a unique channel, or via a bus that shares information among the chipset, the I/O interface, and other elements of information handling system 300. Other I/O interfaces (not illustrated) can also be used in addition to I/O interface 350 as needed or desired. I/O interface 350 is connected via an I/O interface 352 to one or more add-on resources 354. Add-on resource 354 is connected to a storage system 390, and can also include another data storage system, a graphics interface, a network interface card (NIC), a sound/video processing card, another suitable add-on resource or any combination thereof. I/O interface 350 is also connected via I/O interface 352 to one or more platform fuses 356 and to a security resource 358. Platform fuses 356 function to set or modify the functionality of information handling system 300 in hardware. Security resource 358 provides a secure cryptographic functionality and includes secure storage of cryptographic keys. A non-limiting example of security resource 358 includes a Unified Security Hub (USH), a Trusted Platform Module (TPM), a General Purpose Encryption (GPE) engine, another security resource, or a combination thereof.

Disk controller 360 is connected to chipset 320. Disk controller 360 and chipset 320 can be connected via a unique channel, or via a bus that shares information among the chipset, the disk controller, and other elements of information handling system 300. Other disk controllers (not illustrated) can also be used in addition to disk controller 360 as needed or desired. Disk controller 360 includes a disk interface 362. Disk controller 360 is connected to one or more disk drives via disk interface 362. Such disk drives include a hard disk drive (HDD) 364, and an optical disk drive (ODD) 366, and can include one or more disk drive as needed or desired. ODD 366 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 360 is connected to disk emulator 380. Disk emulator 380 permits a solid-state drive 384 to be coupled to information handling system 300 via an external interface 382. External interface 382 can include industry standard busses such as USB or IEEE 1394 (Firewire) or proprietary busses, or any combination thereof. Alternatively, solid-state drive 384 can be disposed within information handling system 300.

Network interface device 370 is connected to I/O interface 350. Network interface 370 and I/O interface 350 can be coupled via a unique channel, or via a bus that shares information among the I/O interface, the network interface, and other elements of information handling system 300. Other network interfaces (not illustrated) can also be used in addition to network interface 370 as needed or desired. Network interface 370 can be a network interface card (NIC) disposed within information handling system 300, on a main circuit board such as a baseboard, a motherboard, or any combination thereof, integrated onto another component such as chipset 320, in another suitable location, or any combination thereof. Network interface 370 includes a network channel 372 that provide interfaces between information handling system 300 and other devices (not illustrated) that are external to information handling system 300. Network interface 370 can also include additional network channels (not illustrated).

Information handling system 300 includes one or more application programs 332, and Basic Input/Output System and Firmware (BIOS/FW) code 334. BIOS/FW code 334 functions to initialize information handling system 300 on power up, to launch an operating system, and to manage input and output interactions between the operating system and the other elements of information handling system 300. In a particular embodiment, application programs 332 and BIOS/FW code 334 reside in memory 330, and include machine-executable code that is executed by processor 310 to perform various functions of information handling system 300. In another embodiment (not illustrated), application programs and BIOS/FW code reside in another storage medium of information handling system 300. For example, application programs and BIOS/FW code can reside in HDD 364, in a ROM (not illustrated) associated with information handling system 300, in an option-ROM (not illustrated) associated with various devices of information handling system 300, in storage system 390, in a storage system (not illustrated) associated with network channel 372, in another storage medium of information handling system 300, or a combination thereof. Application programs 332 and BIOS/FW code 334 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of tunneling management traffic, the method comprising:
   establishing, by a managed system, a first communication via a first network with a management system;
   establishing, by the managed system, a second communication via a second network with a proxy-managed system;
   receiving, by the managed system, identification information sent via the second network from the proxy-managed system, the identification information identifying the proxy-managed system;
   providing, by the managed system, the identification information via the first network to the management system;
   receiving, by the managed system, authentication information sent via the first network from the management system, the authentication information sent in response to the identification information identifying the proxy-managed system;
   authenticating, by the managed system, to the proxy-managed system via the second network using the authentication information sent from the management system;
   determining, by the managed system, that the proxy-managed system is not visible to the management system;
   providing, by the managed system, a user interface to the management system via the first network, the user interface defined by a driver;
   receiving, by the managed system, a modification to a control feature via the user interface from the management system, wherein the modification is determined based on a policy associated with the proxy-managed system; and
   providing, by the managed system, the modification to the control feature via the second network to the proxy-managed system in response to receiving the modification to the control feature from the management system.

2. The method of claim 1, wherein prior to receiving the control feature, the method further comprises:
   determining that the proxy-managed system requires authentication; and
   providing an authentication credential to the proxy-managed system.

3. The method of claim 2, wherein receiving the control feature is in response to providing the authentication credential to the proxy-managed system.

4. The method of claim 2, wherein the managed system includes the authentication credential.

5. The method of claim 2, further comprising:
   determining that the managed system does not include the authentication credential in response to determining that the proxy-managed system requires authentication; and
   receiving the authentication credential from the management system prior to providing the authentication credential to the proxy-managed system.

6. The method of claim 1, further comprising:
   receiving, at the managed system, status information from the proxy-managed system; and
   providing the status information to the management system.

7. The method of claim 1, wherein prior to receiving the control feature, the method further comprises:
   connecting the proxy-managed system to the managed system;
   determining that the managed system does not include a driver for the proxy-managed system; and
   obtaining the driver.

8. A non-transitory computer-readable medium including code for performing a method, the method comprising:
   receiving, at a managed system, a control feature from a proxy-managed system that is connected to the managed system, wherein the control feature is received via a user interface of the proxy-managed system, the user interface defined by a driver for the proxy-managed system instantiated on the managed system;
   determining that the proxy-managed system is not visible to a management system;
   providing the user interface to the management system;
   receiving a modification to the control feature via the user interface from the management system, wherein the modification is determined based on a policy for the proxy-managed system; and providing, from the managed system, the modification to the control feature to the proxy-managed system in response to receiving the modification to the control feature from the management system.

9. The non-transitory computer-readable medium of claim 8, the method further comprising:
   determining that the proxy-managed system requires authentication; and
   providing an authentication credential to the proxy-managed system.

10. The non-transitory computer-readable medium of claim 9, the method further comprising:
   determining that the managed system does not include the authentication credential in response to determining that the proxy-managed system requires authentication; and
   receiving the authentication credential from the management system prior to providing the authentication credential to the proxy-managed system.

11. The non-transitory computer-readable medium of claim 9, wherein receiving the control feature is in response to providing the authentication credential to the proxy-managed system.

12. The non-transitory computer-readable medium of claim 9, wherein the managed system includes the authentication credential.

13. The non-transitory computer-readable medium of claim 8, the method further comprising:
   receiving, at the managed system, status information from the proxy-managed system; and
   providing the status information to the management system.

14. The non-transitory computer-readable medium of claim 8, wherein prior to receiving the control feature, the method further comprises:
   connecting the proxy-managed system to the managed system;
   determining that the managed system does not include a driver for the proxy-managed system; and
   obtaining the driver.

* * * * *